Dec. 27, 1938. L. KOUKAL 2,141,870
COMBINED BOTTLE STOPPER AND LIQUID MEASURING DEVICE
Filed Sept. 9, 1937
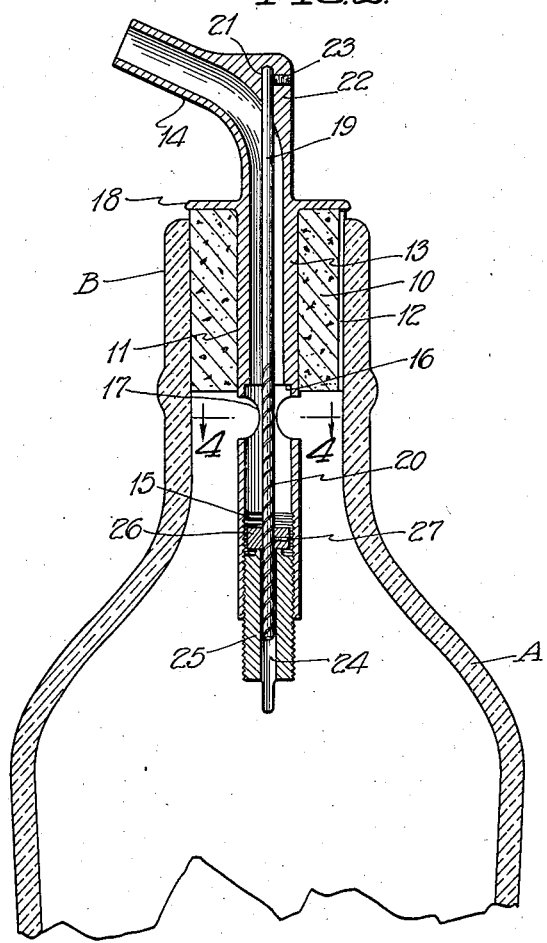
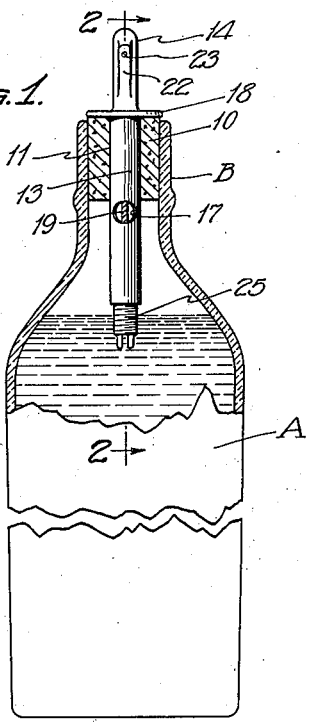
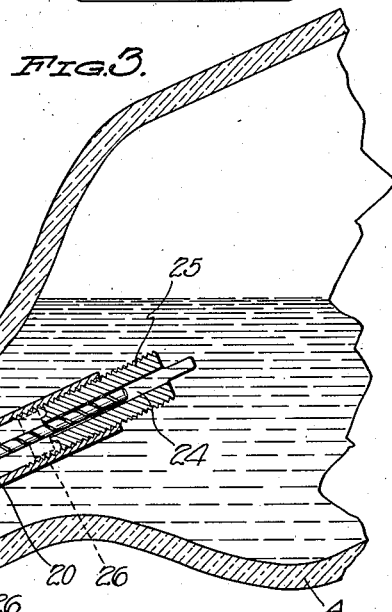
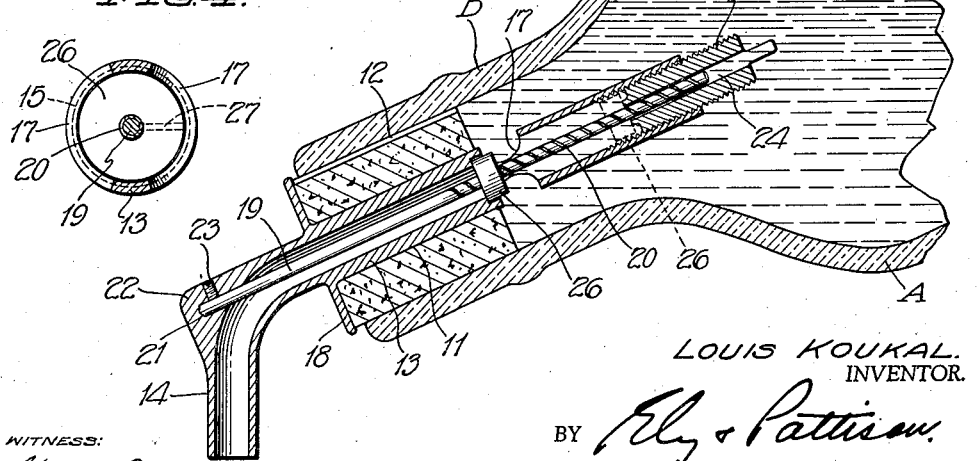
LOUIS KOUKAL.
INVENTOR.
BY Ely & Pattison
ATTORNEYS.

Patented Dec. 27, 1938

2,141,870

UNITED STATES PATENT OFFICE 2,141,870

COMBINED BOTTLE STOPPER AND LIQUID MEASURING DEVICE

Louis Koukal, New York, N. Y.

Application September 9, 1937, Serial No. 162,961

9 Claims. (Cl. 221—98)

This invention relates to improvements in bottle stoppers, and more particularly to a liquid measuring and pouring device.

One of the principal objects of the invention resides in a device which may be substituted for the stopper of a bottle to enable the automatic measuring of a predetermined quantity of liquid poured from the bottle upon each inversion of the same. Such a device will be found useful by drink mixers in the mixing of alcoholic drinks where predetermined quantities of the liquid ingredient is essential in the skillful making of the mixed drinks, and furthermore, less time is required, for the device eliminates the use of separate measuring devices now resorted to in the accurate measuring of liquid ingredients. Also, the device may be used upon medicine bottles to accurately measure prescribed doses, such as for instance, a tablespoonful, a teaspoonful, or the like.

Another feature of the invention is to provide a liquid measuring device which is adjustable to facilitate setting of the same to dispense liquids of predetermined quantities.

A further feature of the invention is the provision of a combined bottle stopper and liquid measuring device which is simple and inexpensive of construction, easy to keep clean, and positive of operation.

With these and other objects in view, the invention resides in the certain novel construction, combination and arrangement of parts, the essential features of which are hereinafter described in the following specification, are particularly pointed out in the appended claims, and are illustrated in the accompanying drawing, in which:

Figure 1 is a vertical sectional view through a bottle showing my bottle stopper and automatic measuring device associated therewith.

Figure 2 is an enlarged vertical sectional view on the line 2—2 of Figure 1.

Figure 3 is a view similar to Figure 2, but showing the bottle tilted for pouring, the valve in closed position in full lines, and in open position in dotted lines.

Figure 4 is an enlarged horizontal sectional view on the line 4—4 of Figure 2.

Referring to the drawing by reference characters, the numeral 10 designates a plug stopper which may be constructed of cork, rubber or other yieldable sealing material. The stopper 10 is provided with a central opening 11 extending therethrough, and with a groove 12 in the outer side wall which extends from one end of the stopper to the other. The groove 12 is provided to enable air to enter a bottle when the same is closed by a plug stopper to displace the liquid contents of a bottle as it is poured therefrom.

Passing through the opening 11 in the stopper 10 and extending well beyond the top outer and bottom inner ends of the stopper is a pouring tube 13, the outer end of which terminates in an angularly extending spout 14. The inner lower end of the pouring tube 13 is internally screw threaded as at 15 and on a plane adjacent the bottom end of the stopper 10, the inner wall of the tube 13 is provided with an annular valve seat 16. Just below the valve seat 16, the tube 13 is provided with inlet openings 17. For limiting the insertion of the tube 13 through the opening 11 in the stopper 10, the tube is provided with an annular flat flange 18 which flatly overlies the top of the plug stopper 10.

Extending axially through the tube 13 is a rod 19, the lower end of which is provided with a spiral groove 20. The upper end of the rod 19 fits into a socket 21 provided in an enlarged boss 22 formed integral with the spout 14, the said end of the rod being held fixed by a set screw 23. The lower end of the rod 19 freely extends into the bore 24 provided in an externally screw threaded stop member 25, the said member being threadedly connected to the threaded portion 15 at the lower end of the tube 13.

Freely turnable on the spiral groove end of the rod 19 is a valve disk member 26, the same being operatively connected to the spiral groove end of the rod by a pin 27 which freely enters the spiral groove 20. Normally, the valve member 26 rests against the inner end of the stop member 25, but when the device is tilted or inverted, the gravity valve member 26 turns on the rod 19 and finally seats against the valve seat 16 to close the passage through the upper end of the pouring tube 13.

In the drawing, I have illustrated my invention in use upon a bottle A with the plug stopper 10 fitting into the open neck of the said bottle. By reference to Figure 1 it will be seen that when the bottle A is in an upright position, the valve member 26 is at rest against the stop member 25. When the bottle is tilted or inverted as shown in Figure 3 to pour the liquid contents from the bottle, the valve member 26 will gradually turn about the spiral groove end of the rod 19 due to the forces of gravity and the spiral groove and pin connection between the valve member and the rod, whereby the valve member eventually comes to rest against the valve seat 16, thus closing the passage from the inside of the bottle to the pouring spout 14. The time interval that it takes the valve member 26 to move from its normal open position to its sealing position against the valve seat 16, determines the quantity of the liquid which may be poured from the bottle A. Thus it will be understood that by adjusting the stop member 25 by reason of its screw connection with the inner end of the tube 13, the amount of liquid dispensed on each pouring operation may be predeterminedly controlled.

Whereas the exterior walls of the plug stopper 10 are in sealing engagement with the neck B of the bottle A, air may enter the bottle through the groove 12 in the plug stopper to displace the contents of the bottle as the same is poured therefrom.

When removing the stopper and measuring device from one bottle for use upon another, the pouring tube 13 may be thoroughly cleansed by unscrewing the stop member 25 and inserting either end of the tube beneath a running faucet in order that the tube may be thoroughly washed out.

While I have shown and described what I consider to be the most practical embodiment of my invention, I wish it to be understood that such changes and alterations as come within the scope of the appended claims may be resorted to if desired.

Having thus described the invention, what is claimed as new is:—

1. A device of the class described comprising in combination, a plug stopper, a tube passing through said stopper and having a pouring spout at the outer end thereof, said tube having inlet openings therein inwardly of the inner end of said stopper, a valve seat within said tube outwardly of said inlet openings, a gravity valve member arranged within said tube inwardly of said valve seat, and a spiral threaded element to which said gravity valve member is threadedly connected.

2. A device of the class described comprising in combination, a plug stopper, a tube passing through said stopper and having a pouring spout at the outer end thereof, said tube having inlet openings therein inwardly of the inner end of said stopper, a valve seat within said tube outwardly of said inlet openings, a gravity valve member captively arranged within said tube inwardly of said valve seat, and a screw rod fixedly connected to said tube and disposed axially therein to which said gravity valve is loosely threaded.

3. A device of the class described comprising in combination, a plug stopper, a tube passing through said stopper and having a pouring spout at the outer end thereof, said tube having inlet openings therein inwardly of the inner end of said stopper, a valve seat within said tube outwardly of said inlet opening, a gravity valve member captively arranged within said tube inwardly of said valve seat, a screw rod fixedly connected to said tube and disposed axially therein to which said gravity valve is loosely threaded, and an adjustable stop member threaded to the inner end of said tube for limiting the inward movement of said valve member.

4. A device of the class described comprising in combination, a plug stopper adapted to be inserted into the open neck of a bottle having an opening therein, a tube passing through said opening and frictionally engaging the walls of the same, a screw rod fixed to said tube and disposed axially therein, said tube having liquid inlet openings inwardly of the plane of the inner end of said stopper, a valve seat within said tube outwardly of said openings, a gravity valve member loosely threaded to said screw rod, and stop means at the inner end of said tube for limiting the inward movement of said gravity valve member.

5. A device of the class described comprising in combination, a plug stopper adapted to be inserted into the open neck of a bottle having an opening therein, a tube passing through said opening and frictionally engaging the walls of the same, a screw rod fixed to said tube and disposed axially therein, said tube having liquid inlet openings inwardly of the plane of the inner end of said stopper, a valve seat within said tube outwardly of said openings, a gravity valve member loosely threaded to said screw rod, and a member threaded to the inner end of said tube in the path of inward movement of said gravity valve member to regulate the extent of inward movement of said valve member relative to said valve seat.

6. A device of the class described comprising in combination, a plug stopper adapted to be inserted into the neck of a bottle, a tube mounted in and extending through said stopper, a pouring spout at the outer end of said tube, valve means within said tube which is open when the device is in an upright position and closed when in tilted or inverted position, and adjustable means for regulating the time interval of the closing of said valve means when the device is moved from a vertical upright position to a tilted inverted pouring position.

7. A device of the class described comprising in combination, a closure member having a pouring outlet passage therein, a valve seat at the inner end of said passage, a valve member, a valve member supporting element carried by said closure member, and a spiral connection between said valve member and said supporting element for prolonging the gravitational movement of said valve member toward and away from said valve seat during alternate inversion of the device.

8. A device of the class described comprising in combination, a closure member having a pouring outlet passage therein, a valve seat at the inner end of said passage, a valve member, a valve member supporting element carried by said closure member, and a spiral connection between said valve member and said supporting element for prolonging the gravitational movement of said valve member toward and away from said valve seat during alternate inversion of the device, and adjustable stop means for limiting the movement of said valve member away from said seat.

9. A device for attachment to the neck of a bottle for measuring predetermined quantities of liquid poured therefrom comprising a closure adapted to be fitted to the neck of a bottle and having a pouring outlet, a valve seat in said outlet, a gravity valve member movable toward and away from said valve seat upon alternate inversion of the device, and spiral means supported by said closure member and with which said gravity valve member is associated to retard the movement of said gravity valve member upon inversion of the device.

LOUIS KOUKAL.